United States Patent
King et al.

(10) Patent No.: US 11,106,596 B2
(45) Date of Patent: Aug. 31, 2021

(54) CONFIGURABLE SKEWED ASSOCIATIVITY IN A TRANSLATION LOOKASIDE BUFFER

(71) Applicant: Advanced Micro Devices, Inc., Sunnyvale, CA (US)

(72) Inventors: John M. King, Austin, TX (US); Michael T. Clark, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 15/389,955

(22) Filed: Dec. 23, 2016

(65) Prior Publication Data

US 2018/0181496 A1 Jun. 28, 2018

(51) Int. Cl.
  *G06F 12/1027* (2016.01)
  *G06F 12/123* (2016.01)
  *G06F 12/127* (2016.01)

(52) U.S. Cl.
  CPC ........ *G06F 12/1027* (2013.01); *G06F 12/123* (2013.01); *G06F 12/127* (2013.01); *G06F 2212/1044* (2013.01); *G06F 2212/303* (2013.01); *G06F 2212/601* (2013.01); *G06F 2212/652* (2013.01); *G06F 2212/683* (2013.01); *G06F 2212/684* (2013.01)

(58) Field of Classification Search
  CPC .... G06F 12/1027; G06F 12/12; G06F 12/122; G06F 2212/68; G06F 2212/69; G06F 2212/652
  See application file for complete search history.

(56) References Cited

U.S. PATENT DOCUMENTS

| | | | |
|---|---|---|---|
| 6,732,238 B1 * | 5/2004 | Evans | G06F 12/0864 365/49.1 |
| 6,854,046 B1 | 2/2005 | Evans et al. | |
| 8,473,684 B2 * | 6/2013 | Olszewski | G06F 12/126 711/133 |
| 2003/0196066 A1 * | 10/2003 | Mathews | G06F 12/1027 711/207 |

(Continued)

OTHER PUBLICATIONS

Concurrent Support of Multiple Page Sizes on a Skewed Associative TLB, André Seznec, IEEE Transactions on Computers, Oct. 9, 2013.*

(Continued)

*Primary Examiner* — David Yi
*Assistant Examiner* — Tahilba O Puche
(74) *Attorney, Agent, or Firm* — Volpe Koenig

(57) ABSTRACT

Methods, devices, and systems for determining an address in a physical memory which corresponds to a virtual address using a skewed-associative translation lookaside buffer (TLB) are described. A virtual address and a configuration indication are received using receiver circuitry. A physical address corresponding to the virtual address is output if a TLB hit occurs. A first subset of a plurality of ways of the TLB is configured to hold a first page size. The first subset includes a number of the ways based on the configuration indication. A physical address corresponding to the virtual address is retrieved from a page table if a TLB miss occurs, and at least a portion of the physical address is installed in a least recently used way of a subset of a plurality of ways the TLB, determined according to a replacement policy based on the configuration indication.

23 Claims, 5 Drawing Sheets

(56) References Cited

U.S. PATENT DOCUMENTS

| | | | |
|---|---|---|---|
| 2009/0204761 A1* | 8/2009 | Caprioli | G06F 12/125 |
| | | | 711/118 |
| 2013/0097387 A1 | 4/2013 | Sanchez Martin et al. | |
| 2013/0254490 A1 | 9/2013 | Olszewski et al. | |
| 2014/0201494 A1* | 7/2014 | Venkumahanti | G06F 12/1027 |
| | | | 711/207 |
| 2016/0259728 A1* | 9/2016 | Eddy | G06F 12/0811 |
| 2016/0342523 A1* | 11/2016 | Rozario | G06F 12/1054 |
| 2016/0357680 A1 | 12/2016 | Hooker et al. | |
| 2017/0315927 A1* | 11/2017 | Loh | G06F 12/1027 |
| 2018/0046583 A1* | 2/2018 | Bybell | G06F 12/128 |

OTHER PUBLICATIONS

Concurrent Support of Multiple Page Sizes on a Skewed Associative TLB, André Seznec, IEEE Transactions on Computers, Oct. 9, 2003.*

Seznec, Andre, "Concurrent Support of Multiple Page Sizes on a Skewed Associative TLB", IEEE Transactions on Computers, Jul. 2004, pp. 924-927, vol. 53, Issue 7, IEEE. USA.

Selén, "Reorganisation in the skewed-associated TLB," Department of Information Technology, Uppsala University, Technical report 2004-027, Sep. 2004, ISSN 1404-3203 (67 pages).

Papadopoulou et al, "Prediction-based superpage-friendly TLB designs," 2015 IEEE 21st International Symposium on High Performance Computer Architecture, Feb. 7, 2015, pp. 210-222.

* cited by examiner

CONFIGURABLE SKEWED ASSOCIATIVITY IN A TRANSLATION LOOKASIDE BUFFER

BACKGROUND

Translation lookaside buffers (TLBs) are hardware structures that are used in computing systems to cache virtual-to-physical address translations and operating system (OS)-page-granularity metadata (e.g., read/write permissions). The TLB is important to performance scalability in computing systems because the TLB is looked up on every memory access. Because the TLB is accessed on every single memory access, it is in the critical timing path and each processor core or accelerator can have its own TLB.

BRIEF DESCRIPTION OF THE DRAWINGS

A more detailed understanding can be had from the following description, given by way of example in conjunction with the accompanying drawings wherein.

DETAILED DESCRIPTION

Figure 1:
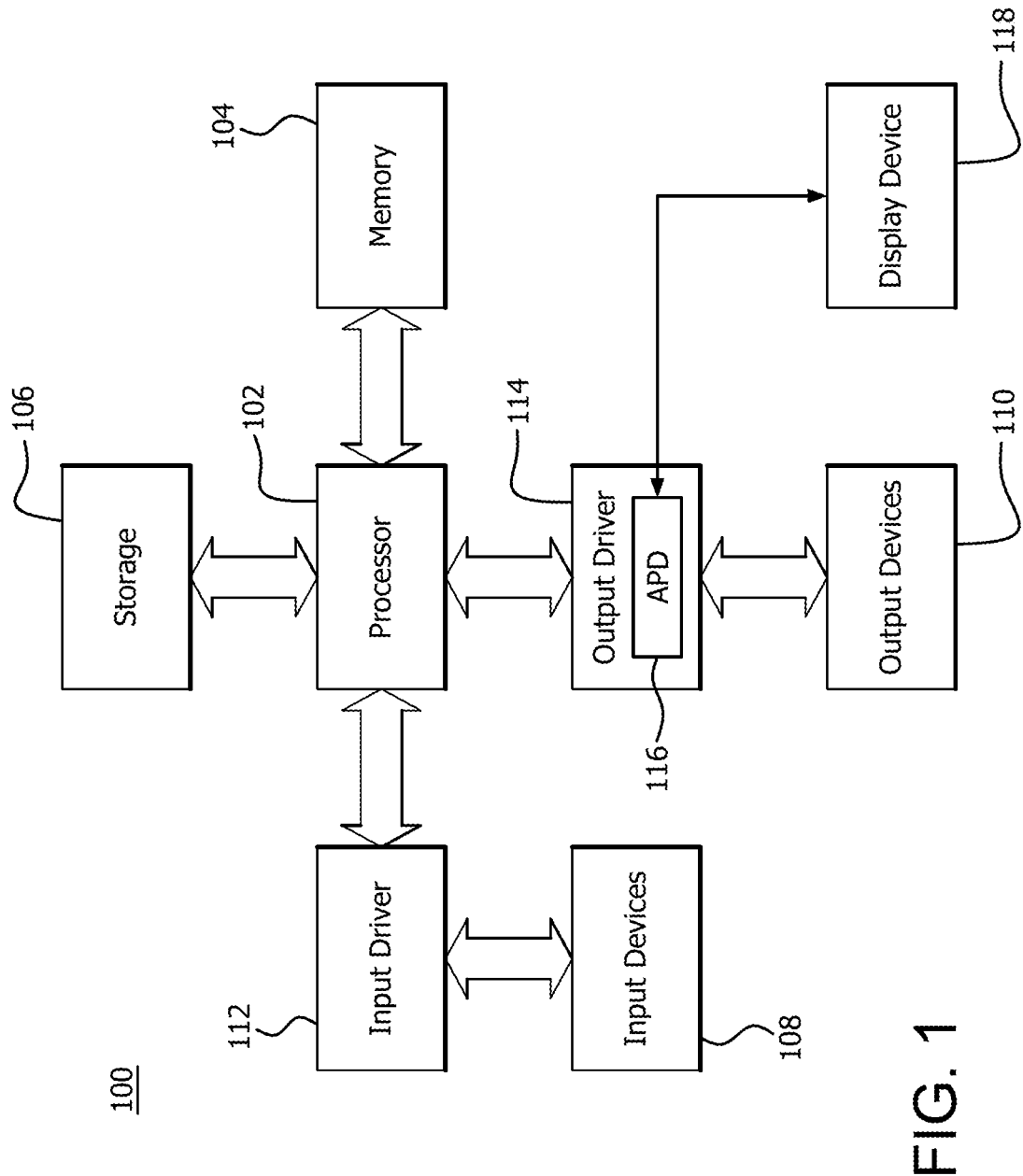
FIG. 1 is a block diagram of an example device in which one or more disclosed alternatives can be implemented.

Some alternatives provide a method for determining an address in a physical memory which corresponds to a virtual address using a skewed-associative translation lookaside buffer. A virtual address and a configuration indication are received using receiver circuitry. A physical address corresponding to the virtual address is output on a condition that a TLB hit occurs. A first subset of a plurality of ways of the TLB is configured to hold a first page size. The first subset includes a number of the ways that is based on the configuration indication.

In some alternatives, a second subset of the plurality of ways is configured to hold a second page size. The second subset includes a number of the ways that is based on the configuration indication. In some alternatives, a ratio of the number of ways included in the first subset to the number of ways included in the second subset is based on the configuration indication. In some alternatives, an index to the plurality of ways is calculated by a skewing function based on the configuration indication. In some alternatives, a subset of bits of the virtual address is input to the skewing function. Which bits of the virtual address are included in the subset of bits is calculated based on the configuration indication. In some alternatives, the configuration indication is received from a basic input output system (BIOS), a blown fuse, an operating system (OS), or a configuration register. In some alternatives, the configuration indication includes a single bit.

Some alternatives provide a skewed-associative translation lookaside buffer (TLB). The TLB includes a plurality of ways, input circuitry configured to receive a virtual address and a configuration indication, and output circuitry configured to output a physical address corresponding to the virtual address on a condition that a TLB hit occurs. The first subset of the ways is configured to hold a first page size. The first subset includes a number of the ways that is based on the configuration indication.

In some alternatives, a second subset of the plurality of ways is configured to hold a second page size. The second subset includes a number of the ways that is based on the configuration indication. In some alternatives, a ratio of the number of ways included in the first subset to the number of ways included in the second subset is based on the configuration indication. In some alternatives, an index to the plurality of ways is calculated by a skewing function based on the configuration indication. In some alternatives, a subset of bits of the virtual address is input to the skewing function. Which bits of the virtual address are included in the subset of bits is calculated based on the configuration indication. In some alternatives, the configuration indication is received from a BIOS, a blown fuse, an OS, or a configuration register. In some alternatives, the configuration indication includes a single bit.

Some alternatives provide an accelerated processing device (APD) including a skewed-associative translation lookaside buffer (TLB). The TLB includes a plurality of ways, input circuitry configured to receive a virtual address and a configuration indication, and output circuitry configured to output a physical address corresponding to the virtual address on a condition that a TLB hit occurs. A first subset of the ways is configured to hold a first page size. The first subset includes a number of the ways that is based on the configuration indication.

In some alternatives, a second subset of the plurality of ways is configured to hold a second page size. The second subset includes a number of the ways that is based on the configuration indication. In some alternatives, a ratio of the number of ways included in the first subset to the number of ways included in the second subset is based on the configuration indication. In some alternatives, an index to the plurality of ways is calculated by a skewing function which is based on the configuration indication. In some alternatives, a subset of bits of the virtual address is input to the skewing function. Which bits of the virtual address are included in the subset of bits is calculated based on the configuration indication. In some alternatives, the configuration indication is received from a BIOS, a blown fuse, an OS, or a configuration register. In some alternatives, the configuration indication includes a single bit.

Some alternatives provide a method for determining an address in a physical memory which corresponds to a virtual address using a skewed-associative translation lookaside buffer (TLB). The method includes using receiver circuitry to receive a virtual address and a configuration indication and retrieving a physical address corresponding to the virtual address from a page table if a TLB miss occurs at least a portion of the physical address is installed in a least recently used (LRU) way of a subset of a plurality of ways of the TLB. The LRU way is determined according to a replacement policy. The replacement policy is based on the configuration indication.

In some alternatives, the subset of the ways includes a number of the plurality of ways that is based on the configuration indication. In some alternatives, a ratio of the number of the plurality of ways included in the subset to a number of ways included in a second subset is based on the configuration indication. In some alternatives, an index to the plurality of ways is calculated by a skewing function based on the configuration indication. In some alternatives, a subset of bits of the virtual address is input to the skewing function. Which bits of the virtual address are included in the subset of bits is calculated based on the configuration indication. In some alternatives, the configuration indication is received from a BIOS, a blown fuse, an OS, or a configuration register. In some alternatives, the configuration indication includes a single bit.

Some alternatives provide a skewed-associative translation lookaside buffer (TLB). The TLB includes a plurality of ways, input circuitry configured to receive a virtual address and a configuration indication, to retrieve a physical address corresponding to the virtual address from a page table on a condition that a TLB miss occurs, and replacement circuitry configured to install at least a portion of the physical address in a least recently used (LRU) way of a subset of a plurality of ways of the TLB. The LRU way is determined according to a replacement policy. The replacement policy is based on the configuration indication.

In some alternatives, the subset of the ways includes a number of the plurality of ways that is based on the configuration indication. In some alternatives, a ratio of the number of the plurality of ways included in the subset to a number of ways included in a second subset is based on the configuration indication. In some alternatives, an index to the plurality of ways is calculated by a skewing function based on the configuration indication. In some alternatives, a subset of bits of the virtual address is input to the skewing function. Which bits of the virtual address are included in the subset of bits is calculated based on the configuration indication. In some alternatives, the configuration indication is received from a BIOS, a blown fuse, an OS, or a configuration register. In some alternatives, the configuration indication includes a single bit.

Some alternatives provide an accelerated processing device (APD) including a skewed-associative translation lookaside buffer (TLB). The TLB includes a plurality of ways, input circuitry configured to receive a virtual address and a configuration indication. The input circuitry is also configured to retrieve a physical address corresponding to the virtual address from a page table if a TLB miss occurs. The TLB also includes replacement circuitry configured to install at least a portion of the physical address in a least recently used (LRU) way of a subset of a plurality of ways of the TLB. The LRU way is determined according to a replacement policy. The replacement policy is based on the configuration indication.

In some alternatives, the subset of the ways includes a number of the plurality of ways that is based on the configuration indication. In some alternatives, a ratio of the number of the plurality of ways included in the subset to a number of ways included in a second subset is based on the configuration indication. In some alternatives, an index to the plurality of ways is calculated by a skewing function based on the configuration indication. In some alternatives, a subset of bits of the virtual address is input to the skewing function; wherein which bits of the virtual address are included in the subset of bits is calculated based on the configuration indication. In some alternatives, the configuration indication is received from a BIOS, a blown fuse, an OS, or a configuration register. In some alternatives, the configuration indication includes a single bit.

FIG. 1 is a block diagram of an example device 100 in which one or more disclosed alternatives can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

The processor 102 includes, for example, a central processing unit (CPU), a graphics processing unit (GPU), a CPU and GPU located on the same die, or one or more processor cores, wherein each processor core can be a CPU or a GPU. The memory 104 can be located on the same die as the processor 102, or can be located separately from the processor 102. The memory 104 includes, for example, a volatile or non-volatile memory, for example, random access memory (RAM), dynamic RAM, or a cache.

The storage 106 includes, for example, a fixed or removable storage, for example, a hard disk drive, a solid state drive, an optical disk, or a flash drive. The input devices 108 include, for example, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, for example, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display.

As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, the functionality described as being performed by the APD 116 can also be performed by other computing devices having similar capabilities that are not driven by a host processor (e.g., processor 102) and configured to provide graphical output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm can perform the functionality described herein.

Figure 2:
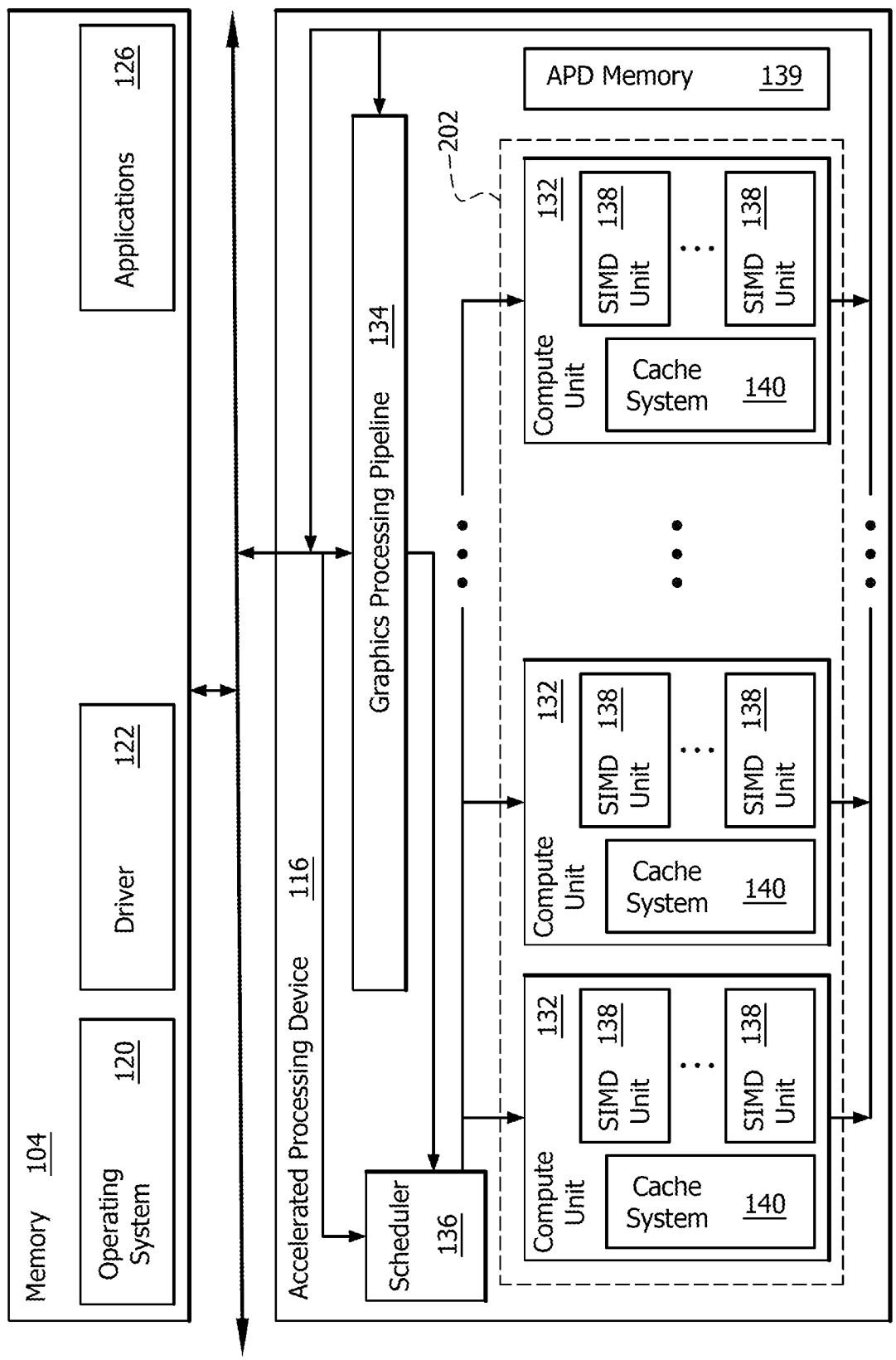
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various aspects of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations, such as those that are suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items are executed simultaneously as a "wavefront" on a single SIMD processing unit 138. Multiple wavefronts are included in a "work group," which includes a collection of work-items designated to execute the same program. A work group are executed by executing each of the wavefronts that make up the work group. The wavefronts are executed sequentially on a single SIMD unit 138 or partially or fully in parallel on different SIMD units 138. Wavefronts are the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. A graphics pipeline 134 which accepts graphics processing commands from the processor 102 can thus provide computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Processor 102 can support virtual memory, and memory 104 includes, for example, a page table having page table entries which map virtual page numbers to physical page numbers in memory. Processor 102 includes or is in operative communication with a translation lookaside buffer (TLB) which caches page table entries so that processor 102 does not need to access memory 104 to retrieve a physical address from the page table for recently used virtual addresses.

Depending upon the virtual memory behavior of an application, different virtual page sizes can yield different performance. For example, using a small page size can avoid allocating physical memory space for unused data or instructions, and using a large page size can result in a single page fault affecting a large amount of data and/or instructions. Accordingly, some architectures support more than one virtual page size.

Set-associative TLBs cannot efficiently support multiple page sizes for a single process. Thus, architectures supporting the use of more than one page size have implemented either fully associative TLBs or using separate TLBs for each page size. A fully associative TLB is limited to a small number of entries, and using distinct partially associative TLBs for different page sizes requires knowledge of the distribution of page sizes for the intended use of the system. This can result in inefficiency where the actual use varies from the predicted page size distribution.

A skewed associative TLB is a variation on an n-way set associative TLB where an input index is modified by a skewing function that is different for some or all of the n-ways of the TLB. A skewed associative TLB can also be used to support more than one page size. In such implementations a fixed number of the ways of a skewed associative TLB is used to support certain page sizes. For example, in a skewed associative TLB having 12 ways, for any TLB lookup, 8 of the ways are dedicated to holding 4 kilobyte size pages, 2 of the ways are dedicated to holding 32 kilobyte size pages, and 2 of the ways are dedicated to holding 2 megabyte size pages. The mapping of which ways hold which page size is not fixed, but is determined by bits of the virtual address.

For some workloads, such as those that heavily utilize small pages, one page size way configuration can work well (e.g., having a small number of ways dedicated for 32 kilobyte and 2 megabyte sized pages, and a greater number dedicated for 4 kilobyte sized pages). Here, more ways are allocated for handling of small pages. For other workloads, such as those that heavily utilize large pages, another page size way configuration can work well (e.g., having a greater number of ways dedicated for 32 kilobyte and 2 megabyte sized pages, and a smaller number dedicated for 4 kilobyte sized pages).

A typical skewed associative TLB is non-configurable, and cannot be optimized for all workloads because although all ways of such TLBs can hold all page sizes, such TLBs are tuned to a particular distribution of page sizes. A non-skewed associative TLB can have even worse performance because not all ways of the TLB can hold all page sizes (and is thus area-inefficient, wasting storage space on page sizes that are not used by some workloads), and because it is also tuned to a particular distribution of page sizes.

Figure 3:
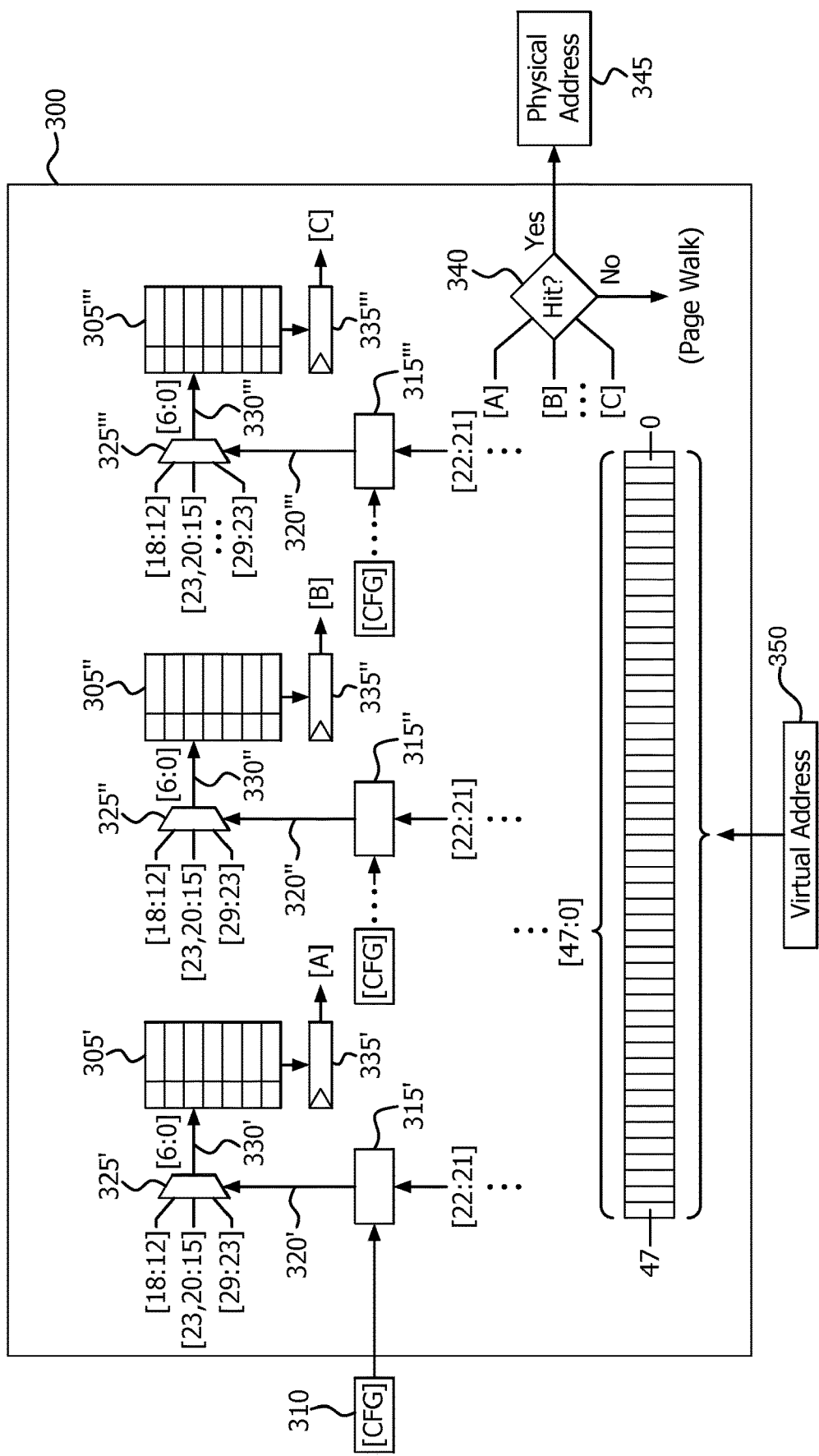
FIG. 3 is a block diagram of an example configurable skewed associative TLB which can be implemented in the device of FIG. 1.

FIG. 3 is a block diagram of an example configurable skewed associative TLB 300. The illustration of skewed associative TLB 300 is simplified for clarity; and it is noted that a skewed associative TLB can include various components (e.g., relating to permissions, additional tagging bits, flushing, etc.) that are not shown. Configurable skewed associative TLB 300 is implemented in device 100 in this example, although it will be appreciated that other implementations are possible. For example, in various implementations TLB 300 is implemented as a component of processor 102, as a component of memory 104, or in a device operatively coupled with processor 102 and memory 104, such as a memory management unit (MMU). Various other implementations of TLB 300 are also possible, both in and out of the context of device 100.

TLB 300 is implemented as a content-addressable memory (CAM) in this example, where the search key is a virtual page number (from a virtual memory address), and the search result is a physical page number for a physical memory address (e.g., of memory 104). TLB 300 includes 16 ways 305 (only three of which, 305', 305", 305"', corresponding to ways 0, 1, and 15, are shown for clarity; all ways are collectively referred to as 305). Ways 305 each include 128 entries, each of which are 48 bits wide. Each entry of ways 305 includes a tag and a payload, where the tag is used for indexing by comparison with the virtual page number, and the payload is a corresponding physical page number (or includes a corresponding physical page number). The page offset of the virtual address can be the same as the page offset of the physical address, and can be used to construct the physical memory address by combining the offset with the physical page number.

TLB 300 supports three different virtual page sizes, 4 kilobytes (4K), 32 kilobytes (32K) and 2 megabytes (2 M). For any lookup in the TLB 300, each way holds a translation that is defined with respect to only one of the different virtual page sizes, and the distribution of supported page sizes among ways 305 is configurable. For example, in an 8-2-2 configuration, 8 of ways 305 are configured to support 4K pages, 2 of ways 305 are configured to support 32K pages, and 2 of ways 305 are configured to support 2 M pages. In contrast, a 6-3-3 configuration would have 6 of ways 305 configured to support 4K pages, 3 of ways 305 configured to support 32K pages, and 3 of ways 305 configured to support 2 M pages. The number of ways, the number and width of way entries, the number and sizes of supported virtual pages, and the number and distribution of way configuration are all exemplary, and any suitable configuration of these components can be used. This applies to all implementations described herein with respect to any figure.

In order to configure the supported page size for each of ways 305 (i.e., to select between the 8-2-2 and 6-3-3 configurations in this example), a configuration bit 310 is input to a skewing function of each way. In some implementations, the configuration bit 310 selects a ratio of the number of ways allocated to each supported page size. Each way includes or is operatively coupled to its own skewing function block (only skewing function blocks 315', 315" and 315"' are shown; all skewing function blocks are collectively referred to as 315) which implements the skewing function for that way. The same configuration bit 310 is input to each skewing function block 315. Configuration bit 310 can be set statically or dynamically in any suitable manner. For example, configuration bit 310 can be set by blowing fuses or setting nonvolatile memory registers in TLB 300 (or other components of a processor on which the TLB is implemented or to which the TLB 300 is operatively coupled), or can be set in the basic input output system (BIOS) of a computer system of which TLB 300 is a component. Configuration bit 310 can also or alternatively be set by an operating system, or otherwise set in a register of the TLB 300 or other component of a processor on which the TLB is implemented or to which the TLB 300 is operatively coupled.

In order to translate a virtual address to a physical address, a virtual address 350 is input to TLB 300. If TLB 300 is a level two (L2) TLB, virtual address 350 can be input from a level one (L1) TLB following an L1 TLB miss for example, although other suitable implementations are possible. Virtual address 350 includes a virtual page number and an offset into the virtual page. Virtual address 350 is 48 bits wide in this example, although other implementations can use any suitable width. In FIG. 3, the 48 bits of virtual address 350 are expressed as [47:0]. A subset of the 48 bits corresponds to the virtual page number, and another subset of the 48 bits corresponds to the offset. Which bits are used depends upon the virtual page size relevant to virtual address 350.

If virtual address 350 reflects a 4K page, bits [47:12] are the page number, and bits [11:0] are the offset into the page. If virtual address 305 reflects a 32K page, bits [47:15] are the page number, and bits [14:0] are the offset into the page. If virtual address 350 reflects a 2 M page, bits [47:21] are the page number, and bits [20:0] are the offset into the page. The least significant bit which is common to all three page sizes is [21]. Accordingly, bits [22:21] are used to determine which ways are used to hold which page sizes for that value of [22:21], and are input to skewing function block 315 for each way. Bits below [21] in the range are not chosen for this purpose because for a 2 M page those bits are part of the offset not the page number, and are not processed by the translation hardware (the offset is passed through to the physical address). In some implementations however, other bits above [21] could be used. Further, one bit or more than two bits could be used for indexing if way configurations supporting only two or greater than three page sizes are implemented.

Skewing function blocks 315 each input the configuration bit 310 and bits [22:21] of virtual address 350, and output a value which generated by applying a skewing function 320 to the inputs. The skewing function 320 for each way can be different (only skewing functions 320', 320" and 320"' are shown; all skewing functions are collectively referred to as 320). Tables 1 and 2 list examples of which ways of the 16 ways 305 are used to store physical addresses of the different page sizes based on the configuration bit 310 (selecting between the 8-2-2 configuration and the 6-3-3 configuration) and bits [22:21] of virtual address 350.

TABLE 1

8-2-2 configuration

| Virtual address [22:21] = 00 | |
|---|---|
| 4K ways | 0, 1, 4, 5, 8, 9, 10, 11 |
| 32K ways | 2, 6 |
| 2M ways | 3, 7 |
| Virtual address [22:21] = 10 | |
| 4K ways | 0, 1, 4, 5, 8, 9, 10, 11 |
| 32K ways | 3, 7 |
| 2M ways | 2, 6 |
| Virtual address [22:21] = 01 | |
| 4K ways | 2, 3, 6, 7, 8, 9, 10, 11 |
| 32K ways | 0, 4 |
| 2M ways | 1, 5 |
| Virtual address [22:21] = 11 | |
| 4K ways | 2, 3, 6, 7, 8, 9, 10, 11 |
| 32K ways | 1, 5 |
| 2M ways | 0, 4 |

TABLE 2

6-3-3 configuration

| Virtual address [22:21] = 00 | |
|---|---|
| 4K ways | 0, 1, 4, 5, 8, 9 |
| 32K ways | 2, 6, 10 |
| 2M ways | 3, 7, 11 |
| Virtual address [22:21] = 10 | |
| 4K ways | 0, 1, 4, 5, 8, 9 |
| 32K ways | 3, 7, 11 |
| 2M ways | 2, 6, 10 |
| Virtual address [22:21] = 01 | |
| 4K ways | 2, 3, 6, 7, 10, 11 |
| 32K ways | 0, 4, 8 |
| 2M ways | 1, 5, 9 |
| Virtual address [22:21] = 11 | |
| 4K ways | 2, 3, 6, 7, 10, 11 |
| 32K ways | 1, 5, 9 |
| 2M ways | 0, 4, 8 |

Each way 305 is indexed by an index multiplexer (325', 325" and 325'" are shown, all index multiplexers are collectively referred to as 325). Each index multiplexer 325 inputs three possible indexes, one for each possible page size of the input virtual address 350. The indexes are ranges of bits of the virtual page number portion of virtual address 350. The range of bits differs for each page size. In this example, index multiplexer 325 inputs bits [18:12] of virtual address 350 if virtual address 350 reflects a 4K page size, inputs bits [23, 20:15] of virtual address 350 if virtual address 350 reflects a 32K page size, or inputs bits [29:23] of virtual address 350 if virtual address 350 reflects a 2 M page size. Each multiplexer 325 selects which of the three possible indexes to use for each way (330', 330" and 330'" are shown; all indexes are collectively referred to as 330) based on its respective skewing function 320.

Each way 305 outputs the payload of the entry corresponding to the index selected by multiplexer 325 as read data (read data 335', 335" and 335'" are shown; all read data are collectively referred to as 335). The read data 335 registers are each checked by comparison circuitry 340 to determine whether a TLB hit has occurred (i.e., that one of the ways has a translation that matches the lookup address). Comparison circuitry 340 determines whether a TLB hit has occurred by determining whether the virtual address tag held in the entry matches the lookup virtual address, and that the page size of the entry read out as read data 335 matches the page size determined by the skewing function (e.g., where the page size is indicated by a page size field in the payload). If a hit has occurred, the read data 335 which resulted in the TLB hit is selected, and the physical address 345 corresponding to the virtual address 350 is output from the TLB.

Figure 4:
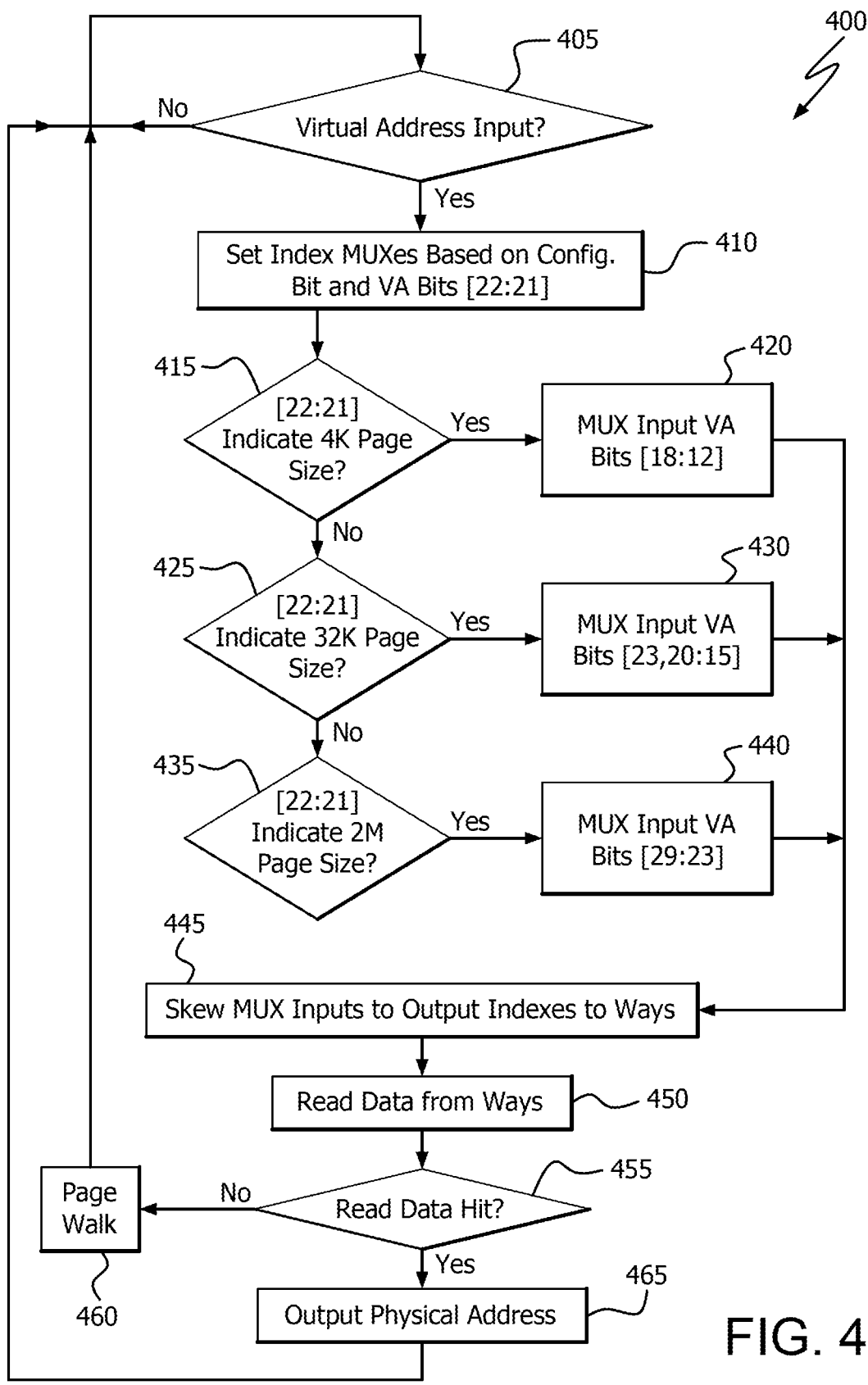
FIG. 4 is a flow chart illustrating an example method for looking up a virtual address in the configurable skewed associative TLB of FIG. 3.

FIG. 4 is a flow chart illustrating an example method 400 for translating a virtual address to a physical memory address using the configurable skewed associative TLB 300 of FIG. 3.

On a condition 405 that virtual address 350 is input to the TLB, index multiplexers 325 are set in step 410, based on a subset of the bits of the virtual address 350 (in this example, bits [22:21]) to input one of the three possible indexes, one for each page size, using bits from virtual address 350.

The range of bits differs for each page size. On a condition 415 that bits [22:21] indicate that virtual address 350 corresponds to a first page size (in this example, 4K), index multiplexers 325 input a first subset of the bits of the virtual address 350 (in this example, bits [18:12]) in step 420. On a condition 425 that bits [22:21] indicate that virtual address 350 corresponds to a second page size (in this example, 32K), index multiplexers 325 input a second subset of the bits of the virtual address 350 (in this example, bits [23, 20:15]) in step 430. On a condition 435 that bits [22:21] indicate that virtual address 350 corresponds to a third page size (in this example, 2 M), index multiplexers 325 input a third subset of the bits of the virtual address 350 (in this example, bits [29:23]) in step 440.

After the index multiplexers 325 have input the appropriate bits of virtual address 310, each multiplexer 325 selects one the inputs based on its respective skewing function 320 to generate indexes 330 to each way 305 (step 445). If any of indexes 330 hits an entry in one of ways 305, the corresponding physical page number is output to the respective read data 335 register (step 450). On a condition 455 that the result is a TLB miss, TLB 300 initiates a page walk in step 460. If the result is a TLB hit, physical address 345 corresponding to the virtual address 350 is output from the TLB based on the physical address output as read data 335 and the page offset of the virtual address 350 (step 465).

If a TLB miss occurs, TLB 300 retrieves the corresponding physical address 345 via known methods, such as by walking a page table, and installs the retrieved physical address 345 in one of ways 305 according to a replacement policy. The replacement policy used can depend upon the distribution of supported page sizes among ways 305. For example, a different replacement policy can be used for 4K pages depending upon whether 4K pages are stored in an 8-way associative configuration (e.g., the 8-2-2 configuration described above) or in a 6-way associative configuration (e.g., the 6-3-3 configuration described above).

In one example, a standard pseudo-least-recently-used (pseudo-LRU; i.e., tree-LRU) scheme is implemented to determine which way 305 contains an entry corresponding to the index 330 that is least recently used for 4K pages in the 8-way associative configuration. A hybrid LRU scheme can be implemented to determine the LRU entry for 4K pages in the 6-way associative configuration. Which LRU scheme to use can be selected using the configuration bit 310.

Each line of TLB 300 has an associated sequence of 7 bits (which can be referred to as LRU bits) for tracking how recently the line has been accessed. The seven LRU bits apply to the same index in all ways, so in this example there are 128 groups of LRU bits. Each set of LRU bits indicates which way is least recently used for its respective index of TLB 300. By selecting the appropriate LRU scheme to apply to the LRU bits, the same LRU bits can be used to track which way is least recently used for the 8-2-2 configuration or the 6-3-3 configuration.

Figure 5:
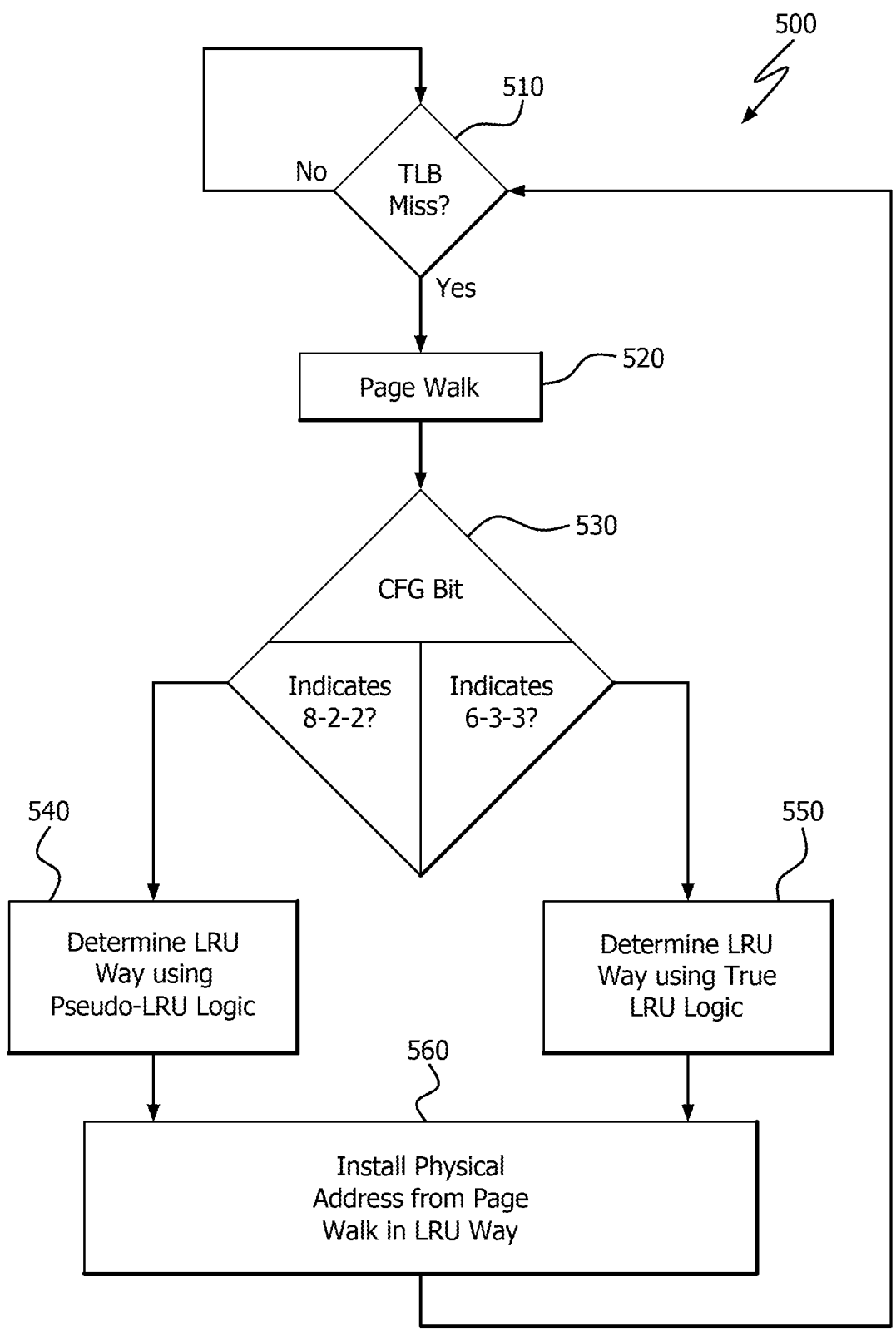
FIG. 5 is a flow chart illustrating an example method for handling a TLB miss in the configurable skewed associative TLB of FIG. 3.

FIG. 5 is a flow chart which illustrates an example method 500 for handling a TLB miss. On a condition 510 that a TLB miss has occurred (e.g., as in step 455 of FIG. 4), TLB 300 initiates a page walk according to known methods in step 520 to retrieve the physical address. On a condition 530 that configuration bit 310 indicates that 8 of the 16 ways 305 are configured to support 4 k pages (i.e., the 8-2-2 configuration described above), the least recently used one of ways 305 that is configured for 4K pages is determined using LRU logic in step 540. In some implementations, the LRU logic includes pseudo-LRU (i.e., "tree" LRU) logic. On a condition 530 that configuration bit 310 indicates that 6 of the 16 ways 305 are configured to support 4K pages (i.e., the 6-3-3 configuration described above), the least recently used one of ways 305 that is configured for 4K pages is determined using LRU logic in step 550. In some implementations, the LRU logic in step 550 follows a hybrid scheme including both "tree" LRU and "true" LRU logic. In either case, the physical address retrieved during the page walk is installed in the least recently used of ways 305 that is configured for 4K pages, as determined in either step 540 or 550 (step 560). Corresponding procedures are also used for the 32K and 2 M page sizes.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the alternatives.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for determining an address in a physical memory which corresponds to a virtual address using a skewed-associative translation lookaside buffer (TLB), the method comprising:
    receiving, by a TLB, a configuration indication that is not a part of the virtual address;
    configuring, based on a first subset of a virtual address, a first subset of a plurality of ways of the TLB to index physical addresses with respect to a first page size and not to index physical addresses with respect to a second page size, wherein the first subset of the virtual address is based on the configuration indication;
    configuring, based on a second subset of the virtual address, a second subset of the plurality of ways of the TLB to index physical addresses with respect to the second page size and not to index physical addresses with respect to the first page size, wherein the second subset of the virtual address is based on the configuration indication;
    receiving a virtual address; and
    outputting a physical address corresponding to the virtual address on a condition that a TLB hit occurs.

2. The method of claim 1, wherein a ratio of a number of ways included in the first subset to a number of ways included in the second subset is based on the configuration indication.

3. The method of claim 1, wherein an index to the plurality of ways is calculated by a skewing function based on the configuration indication.

4. The method of claim 3, wherein a subset of bits of the virtual address is input to the skewing function, and which bits of the virtual address are included in the subset of bits is calculated based on the configuration indication.

5. The method of claim 1, wherein the configuration indication is received from a basic input output system (BIOS), a blown fuse, an operating system, or a configuration register.

6. A skewed-associative translation lookaside buffer (TLB), comprising:
    input circuitry configured to receive a virtual address and a configuration indication that is not a part of the virtual address;
    a plurality of ways;
    wherein a first subset of the plurality of ways is configured, based on a first subset of a virtual address, to index physical addresses with respect to only a first page size, wherein the first subset of the virtual address is based on the configuration indication;
    wherein a second subset of the plurality of ways is configured, based on a second subset of the virtual address, to index physical addresses with respect to a second page size and not to index physical addresses with respect to the first page size, wherein the second subset of the virtual address is based on the configuration indication; and
    output circuitry configured to output a physical address corresponding to the virtual address on a condition that a TLB hit occurs.

7. The skewed-associative TLB of claim 6, wherein a ratio of a number of ways included in the first subset to a number of ways included in the second subset is based on the configuration indication.

8. The skewed-associative TLB of claim 6, wherein an index to the plurality of ways is calculated by a skewing function based on the configuration indication.

9. The skewed-associative TLB of claim 8, wherein a subset of bits of the virtual address is input to the skewing function, and which bits of the virtual address are included in the subset of bits is calculated based on the configuration indication.

10. The skewed-associative TLB of claim 6, wherein the configuration indication is received from a basic input output system (BIOS), a blown fuse, an operating system (OS), or a configuration register.

11. A method for determining an address in a physical memory which corresponds to a virtual address using a skewed-associative translation lookaside buffer (TLB), the method comprising:
receiving, by a TLB, using receiver circuitry, a virtual address and a configuration indication that is not a part of the virtual address;
retrieving a physical address corresponding to the virtual address from a page table on a condition that a TLB miss occurs; and
installing at least a portion of the physical address in a least recently used (LRU) way of a subset of a plurality of ways of the TLB, the subset comprising a number of ways configured, based on a first subset of the virtual address, to index physical addresses with respect to a first page size and not to index physical addresses with respect to a second page size, wherein the first subset of the virtual address is based on the configuration indication, wherein a second subset of the plurality of ways is configured based on a second subset of the virtual address, to index physical addresses with respect to a second page size and not to index physical addresses with respect to the first page size, and wherein the second subset of the virtual address is based on the configuration indication;
wherein the LRU way is determined according to a replacement policy, and the replacement policy is based on a distribution of supported page sizes among the plurality of ways.

12. The method of claim 11, wherein the subset of the plurality of ways includes a number of the plurality of ways that is based on the configuration indication.

13. The method of claim 11, wherein a ratio of a number of the plurality of ways included in the subset to a number of ways included in the second subset is based on the configuration indication.

14. The method of claim 11, wherein an index to the plurality of ways is calculated by a skewing function based on the configuration indication.

15. The method of claim 14, wherein a subset of bits of the virtual address is input to the skewing function; wherein which bits of the virtual address are included in the subset of bits is calculated based on the configuration indication.

16. The method of claim 11, wherein the configuration indication is received from a basic input output system (BIOS), a blown fuse, an operating system (OS), or a configuration register.

17. The method of claim 11, wherein the configuration indication comprises a single bit.

18. A skewed-associative translation lookaside buffer (TLB), comprising:
a plurality of ways;
input circuitry configured to:
receive a virtual address and a configuration indication that is not a part of the virtual address; and
retrieve a physical address corresponding to the virtual address from a page table on a condition that a TLB miss occurs; and
replacement circuitry configured to install at least a portion of the physical address in a least recently used (LRU) way of a subset of a plurality of ways of the TLB, the subset comprising a number of the plurality of ways configured, based on a first subset of the virtual address, to index physical addresses with respect to a first page size and not to index physical addresses with respect to a second page size, wherein the first subset of the virtual address is based on the configuration indication, wherein a second subset of the plurality of ways is configured based on a second subset of the virtual address, to index physical addresses with respect to a second page size and not to index physical addresses with respect to the first page size, and wherein the second subset of the virtual address is based on the configuration indication;
wherein the LRU way is determined according to a replacement policy, and the replacement policy is determined based on a distribution of supported page sizes among the plurality of ways.

19. The skewed-associative TLB of claim 18, wherein a ratio of a number of the plurality of ways included in the subset to a number of ways included in the second subset is based on the configuration indication.

20. The skewed-associative TLB of claim 18, wherein an index to the plurality of ways is calculated by a skewing function based on the configuration indication.

21. The skewed-associative TLB of claim 20, wherein a subset of bits of the virtual address is input to the skewing function; wherein which bits of the virtual address are included in the subset of bits is calculated based on the configuration indication.

22. The skewed-associative TLB of claim 18, wherein the configuration indication is received from a basic input output system (BIOS), a blown fuse, an operating system (OS), or a configuration register.

23. The skewed-associative TLB of claim 18, wherein the configuration indication comprises a single bit.

* * * * *